United States Patent [19]

Bradbury et al.

[11] Patent Number: 5,296,448
[45] Date of Patent: Mar. 22, 1994

[54] THERMAL TRANSFER PRINTING

[75] Inventors: Roy Bradbury, St Helens; Alan Butters, Ipswich, both of England

[73] Assignee: Imperial Chemical Industries PLC, London, England

[21] Appl. No.: 107,161

[22] Filed: Aug. 17, 1993

Related U.S. Application Data

[63] Continuation of Ser. No. 809,341, Dec. 18, 1991, abandoned.

[30] Foreign Application Priority Data

Dec. 21, 1990 [GB] United Kingdom ............... 9027918
Jan. 18, 1991 [GB] United Kingdom ............... 9101096

[51] Int. Cl.$^5$ .................. B41M 5/035; B41M 5/38
[52] U.S. Cl. .................. 503/227; 428/195; 428/913; 428/914
[58] Field of Search ............ 8/471; 428/195, 913, 428/914; 503/227

[56] References Cited

U.S. PATENT DOCUMENTS

| | | | |
|---|---|---|---|
| 4,743,581 | 5/1988 | Gregroy | 503/227 |
| 4,977,135 | 12/1990 | Bradbury et al. | 503/227 |
| 5,070,069 | 12/1991 | Bradbury et al. | 503/227 |
| 5,106,815 | 4/1992 | Akada et al. | 503/229 |

FOREIGN PATENT DOCUMENTS

| | | | |
|---|---|---|---|
| 0218397 | 4/1987 | European Pat. Off. ........... 503/227 |
| 0351968 | 1/1990 | European Pat. Off. ....... B41M 5/26 |
| 0366261 | 5/1990 | European Pat. Off. ....... B41M 5/26 |

*Primary Examiner*—B. Hamilton Hess
*Attorney, Agent, or Firm*—Cushman, Darby & Cushman

[57] ABSTRACT

A thermal transfer printing sheet comprising a substrate having a coating of a disazo dye of Formula (1):

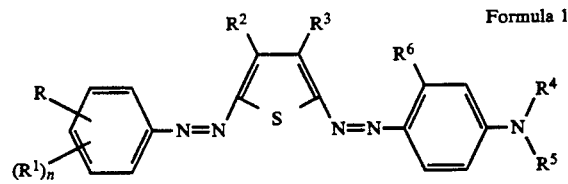

Formula 1 wherein:
R is selected from —H; —CN; —NO$_2$; —COT$^1$; —SO$_2$T$^1$; —COOT$^1$; —SO$_2$F; and —SO$_2$Cl;
each
 R$^1$ is independently selected from —H; —F, —Cl, —Br; and —CF$_3$;
n is 1, 2 or 3;
R$^2$ is —H or C$_{1-4}$-alkyl;
R$^3$ is —CN;
R$^4$ is a straight or branched chain C$_{1-6}$-alkyl;
R$^5$ is

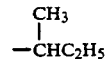
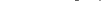

(sec.butyl); and
R$^6$ is selected from —H; C$_{1-4}$-alkyl; and —NHCOT$^1$; wherein T$^1$ is C$_{1-4}$-alkyl or phenyl.

4 Claims, No Drawings

THERMAL TRANSFER PRINTING

This is a continuation of application Ser. No. 809,341, filed on Dec. 18, 1991, which was abandoned upon the filing hereof.

This specification describes an invention relating to dye diffusion thermal transfer printing (DDTTP), especially to a transfer sheet carrying a dye (or dye mixture) which has an improved print stability and to a transfer printing process in which dye is transferred from the transfer sheet to a receiver sheet by the application of heat.

It is known to print woven or knitted textile material by a thermal transfer printing (TTP) process. In such a process a sublimable dye is applied to a paper substrate (usually as an ink also containing a resinous or polymeric binder to bind the dye to the substrate until it is required for printing) in the form of a pattern, to produce a transfer sheet comprising a paper substrate printed with a pattern which it is desired to transfer to the textile. Substantially all the dye is then transferred from the transfer sheet to the textile material, to form an identical pattern on the textile material, by placing the patterned side of the transfer sheet in contact with the textile material and heating the sandwich, under light pressure from a heated plate, to a temperature from 180°–220° C. for a period of 30–120 seconds.

As the surface of the textile substrate is fibrous and uneven it will not be in contact with the printed pattern on the transfer sheet over the whole of the pattern area. It is therefore necessary for the dye to be sublimable and vaporise during passage from the transfer sheet to the textile substrate in order for dye to be transferred from the transfer sheet to the textile substrate over the whole of the pattern area.

As heat is applied evenly over the whole area of the sandwich over a sufficiently long period for equilibrium to be established, conditions are substantially isothermal, the process is non-selective and the dye penetrates deeply into the fibres of the textile material.

In DDTTP, a transfer sheet is formed by applying a heat-transferable dye to a thin (usually <20 micron) substrate having a smooth plain surface (usually as an ink also containing a polymeric or resinous binder to bind the dye to the substrate) in the form of a continuous even film over the entire printing area of the transfer sheet. Dye is then selectively transferred from the transfer sheet by placing it in contact with a material having a smooth surface with an affinity for the dye, hereinafter called the receiver sheet, and selectively heating discrete areas of the reverse side of the transfer sheet for periods from about 1 to 20 milliseconds (msec) and temperatures up to 300° C., in accordance with a pattern information signal whereby dye from the selectively heated regions of the transfer sheet is transferred to the receiver sheet and forms a pattern thereon in accordance with the pattern in which heat is applied to the transfer sheet. The shape of the pattern is determined by the number and location of the discrete areas which are subjected to heating and the depth of shade in any discrete area is determined by the period of time for which it is heated and the temperature reached.

Heating is generally, though not necessarily, effected by a bank of pixels, over which the receiver and transfer sheet are passed together. Each pixel can be separately heated to 300° to 400° C., in less than 20 msec and preferably less than 10 msec, usually by an electric pulse in response to a pattern information signal. During the heating period the temperature of a pixel will rise from about 70° C. to 300°–400° C. over about 5–8 msec. With increase in temperature and time more dye will diffuse from the transfer to the receiver sheet and thus the amount of dye transferred onto, and the depth of shade at, any discrete area on the receiver sheet will depend on the period for which a pixel is heated while it is in contact with the reverse side of the transfer sheet.

As heat is applied through indiviually energised pixels for very short periods of time, conditions are adiabatic, the process is selective in terms of location and quantity of dye transferred and the transferred dye remains close to the surface of the receiver sheet.

It is clear that there are significant distinctions between TTP onto synthetic textile materials and DDTTP onto smooth polymeric surfaces and thus dyes which are suitable for the former process are not necessarily suitable for the latter.

In DDTTP it is important that the surfaces of the transfer sheet and receiver sheet are even so that good contact can be achieved between the printed surface of the the transfer sheet and the receiving surface of the receiver sheet over the entire printing area because it is believed that the dye is transferred substantially by diffusion. Thus, any defect or speck of dust which prevents good contact over any part of the printing area will inhibit transfer and produce an unprinted portion on the receiver sheet which can be considerably larger than the area of the speck or defect. The receiving surfaces of the substrate of the transfer and receiver sheets are usually a smooth polymeric film, especially of a polyester, which has some affinity for the dye.

Important criteria in the selection of a dye for DDTTP are its thermal properties, brightness of shade, fastness properties, such as light fastness, and facility for application to the substrate in the preparation of the transfer sheet. For suitable performance the dye or dye mixture should transfer evenly and rapidly, in proportion to the heat applied to the transfer sheet so that the depth of shade on the receiver sheet is proportional to the heat applied and a true grey scale of coloration can be achieved on the receiver sheet. After transfer the dye should preferably not migrate or crystallise and should have excellent fastness to light, heat, rubbing, especially rubbing with a oily or greasy object, e.g. a human finger, such as would be encountered in normal handling of of the printed receiver sheet. Full colour DDTTP is generally an additive trichromatic process and therefore brightness of shade is important in order to achieve as wide a range of colours from the three primary shades of yellow, magenta and cyan. However, it may be desirable to obtain certain other shades, such as navies and blacks, using single or pre-mixed dyes, rather than to develop these from the normal yellow, magenta and cyan trichromat. As the dye should be sufficiently mobile to migrate from the transfer sheet to the receiver sheet at the temperatures employed, 100°–400° C., in the short time-scale, generally <20 msec, it is preferably free from ionic and water-solubilising groups, and is thus not readily soluble in aqueous or water-miscible media, such as water and ethanol. Many potentially suitable dyes are also not readily soluble in the solvents which are commonly used in, and thus acceptable to, the printing industry; for example, alcohols such as i-propanol, ketones such as methyl ethyl ketone (MEK), methyl i-butyl ketone (MIBK) and cyclohexanone, ethers such as tetrahydrofuran and aromatic hydrocarbons such as toluene. The dye can be applied as a dispersion in a suitable medium or as a solution in a suitable solvent to the substrate from a solution. In order to achieve the potential for a deep shade on the receiver sheet it is desirable that the dye should be readily soluble or readily dispersable in the ink medium. It is also important that a dye which has been applied to a transfer sheet from a solution should be resistant to crystallisation so that it remains as an amorphous layer on the transfer sheet for a considerable time. Crystallisation not only produces defects which prevent good contact between the transfer receiver sheet but gives rise to uneven prints.

The following combination of properties is highly desirable for a dye which is to be used in DDTTP:-

Ideal spectral characteristics (narrow absorption curve with absorption maximum matching a photographic filter)

High tinctorial strength.

Correct thermochemical properties (high thermal stability and efficient transferability with heat).

High optical densities on printing.

Good solubility in solvents acceptable to printing industry: this is desirable to produce solution coated dyesheets alternatively good dispersion in acceptable media is desirable to produce dispersion coated dyesheets.

Stable dyesheets (resistant to dye migration or crystallisation).

Stable printed images on the receiver sheet (resistant to heat, migration, crystallisation, grease, rubbing and light).

The achievement of good light fastness in DDTTP is extremely difficult because of the unfavourable environment of the dye, close to the surface of the polyester receiver sheet. Many known dyes for polyester fibre with high light fastness (>6 on the International Scale of 1-8) on polyester fibre when applied by TTP when penetration into the fibres is good, exhibit very poor light fastness on a polyester receiver sheet when applied by DDTTP.

The Invention

According to the present invention there is provided a thermal transfer printing sheet comprising a substrate having a coating of a disazo dye of Formula (1):

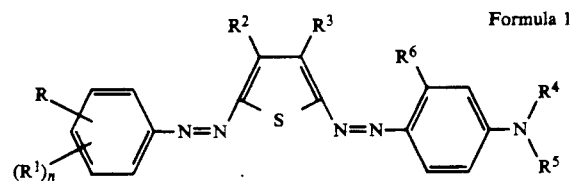

Formula 1 wherein:
R is selected from —H; —CN; —NO$_2$; —COT$^1$; —SO$_2$T$^1$; —COOT$^1$; —SO$_2$F; and —SO$_2$Cl;

each
R$^1$ is independently selected from —H; —F, —Cl, —Br; and —CF$_3$;
n is 1, 2 or 3;
R$^2$ is —H or C$_{1-4}$-alkyl;
R$^3$ is —CN;
R$^4$ is a straight or branched chain C$_{1-6}$-alkyl;
R$^5$ is $$\begin{array}{c} CH_3 \\ | \\ -CHC_2H_5 \end{array}$$

(sec.butyl); and
R$^6$ is selected from —H; C$_{1-4}$-alkyl; and —NHCOT$^1$; wherein T$^1$ is C$_{1-4}$-alkyl or phenyl.

Groups represented by R are preferably —H, —CN, —NO$_2$, —COOT$^1$ or —COT$^1$ and more preferably —H, —COOT$^1$ or —COT$^1$.

Groups represented by R$^1$ are preferably independently selected from —H, —F and —Cl.

Groups represented by R$^2$ are preferably —H or —CH$_3$.

Groups represented by R$^4$ are preferably C$_{1-4}$-alkyl, more preferably —C$_2$H$_5$, n—C$_3$H$_7$, n—C$_4$H$_9$, iso—C$_4$H$_9$, sec—C$_4$H$_9$ and t—C$_4$H$_9$, and especially n—C$_4$H$_9$.

Groups represented by R$^6$ are preferably —H, —CH$_3$ or —NHCOCH$_3$.

A preferred dye of Formula (1) is that in which R, R$^1$ and R$^2$ are —H, R$^3$ is —CN, R$^4$ is n—C$_4$H$_9$, R$^5$ is sec.butyl and R$^6$ is —NHCOCH$_3$.

Specific examples of suitable dyes of Formula (1) in which R$^1$ and R$^2$ are —H and R$^3$ is 13 CN are shown in Table 1.

TABLE 1

| Dye | R | R$^4$ | R$^5$ | R$^6$ |
|---|---|---|---|---|
| 1 | H | n-C$_4$H$_9$ | sec.C$_4$H$_9$ | NHCOCH$_3$ |
| 2 | p-(n-C$_4$H$_9$COO—) | " | " | " |
| 3 | p-(C$_2$H$_5$COO—) | " | " | " |
| 4 | m-(C$_2$H$_5$COO—) | " | " | " |
| 5 | p-(CH$_3$CO—) | " | " | " |
| 6 | H | C$_2$H$_5$ | " | " |
| 7 | m-(CH$_3$CO) | n-C$_4$H$_9$ | " | " |

The dyes of Formula (1) give good optical densities and give surprisingly good grease resistance.

The Coating

The coating suitably comprises a binder together with a dye of Formula (1). The ratio of binder to dye is preferably at least 1:1 and more preferably from 1.5:1 to 4:1 in order to provide good adhesion between the dye and the substrate and inhibit migration of the dye during storage.

The coating may also contain other additives, such as curing agents, preservatives, etc., these and other ingredients being described more fully in EP 133011A, EP 133012A and EP 111004A.

The Binder

The binder may be any resinous or polymeric material suitable for binding the dye to the substrate which has acceptable solubility in the ink medium, i.e. the medium in which the dye and binder are applied to the transfer sheet. It is preferred however, that the dye is soluble in the binder so that it can exist as a solid solution in the binder on the transfer sheet. In this form it is generally more resistant to migration and crystallisation during storage. Examples of binders include cellulose derivatives, such as ethylhydroxyethylcellulose (EHEC), hydroxypropylcellulose (HPC), ethylcellulose, methylcellulose, cellulose acetate and cellulose acetate butyrate; carbohydrate derivatives, such as starch; alginic acid derivatives; alkyd resins; vinyl resins and derivatives, such as polyvinyl alcohol, polyvinyl acetate, polyvinyl butyral and polyvinyl pyrrolidone; polymers and co-polymers derived from acrylates and acrylate derivatives, such as polyacrylic acid, polymethyl methacrylate and styrene-acrylate copolymers, polyester resins, polyamide resins, such as melamines; polyurea and polyurethane resins; organosilicones, such as polysiloxanes, epoxy resins and natural resins, such as gum tragacanth and gum arabic. Mixtures of two or more of the above resins may also be used. It is also preferred to use a binder which is soluble in one of the above-mentioned commercially acceptable organic solvents. Preferred binders of this type are EHEC, particularly the low and extra-low viscosity grades, and ethyl cellulose.

The dyes of Formula (1) have good thermal properties giving rise to even prints on the receiver sheet, whose depth of shade is accurately proportional to the quantity of applied heat so that a true grey scale of coloration can be attained.

The dyes of Formula (1) also have strong coloristic properties and good solubility in a wide range of solvents, especially those solvents which are widely used and accepted in the printing industry, for example, alkanols, such as i-propanol and butanol; aromatic hydrocarbons, such as toluene, and ketones such as MEK, MIBK and cyclohexanone. Alternatively the dye may be dispersed by high shear mixing in suitable media such as water, in the presence of dispersing agents. This produces inks (solvent plus dye and binder) which are stable and allow production of solution or dispersion coated dyesheets. The latter are stable, being resistant to dye crystallisation or migration during prolonged storage.

The combination of strong coloristic properties and good solubility in the preferred solvents allows the achievement of deep, even shades on the receiver sheet. The receiver sheets according to the present invention have bright, strong and even cyan shades which are fast to both light and heat and are particularly resistant to the effects of finger grease.

The Substrate

The substrate may be any sheet material preferably having at least one smooth even surface and capable of withstanding the temperatures involved in DDTTP, i.e. up to 400° C. for periods up to 20 msec, yet thin enough to transmit heat applied on one side through to the dyes on the other side to effect transfer of the dye onto a receiver sheet within such short periods. Examples of suitable materials are polymers, especially polyester, polyacrylate, polyamide, cellulosic and polyalkylene films, metallised forms thereof, including co-polymer and laminated films, especially laminates incorporating a smooth even polyester receptor layer on which the dye is deposited. Thin (<20 micron) high quality paper of even thickness and having a smooth coated surface, such as capacitor paper, is also suitable. A laminated substrate preferably comprises a backcoat, on the opposite side of the laminate from the receptor layer, of a heat resistant material, such as a thermosetting resin, e.g a silicone, acrylate or polyurethane resin, to separate the heat source from the polyester and prevent melting of the latter during the DDTTP operation. The thickness of the substrate depends to some extent upon its thermal conductivity but it is preferably less than 20 um and more preferably less than 10 um.

The DDTTP Process

According to a further feature of the present invention there is provided a dye diffusion thermal transfer printing process which comprises contacting a transfer sheet comprising a coating comprising a dye of Formula (1) with a receiver sheet, so that the coating is in contact with the receiver sheet and selectively applying heat to discrete areas on the reverse side of the transfer sheet whereby the dye on the opposite side of the sheet to the heated areas is transferred to the receiver sheet.

Heating in the selected areas can be effected by contact with heating elements (pixels), which can be heated to 200°-450° C., preferably 200°-400° C., over periods of 2 to 10 msec, whereby the dye mixture may be heated to 150°-300° C., depending on the time of exposure, and thereby caused to transfer, substantially by diffusion, from the transfer to the receiver sheet. Good contact between coating and receiver sheet at the point of application is essential to effect transfer. The density of the printed image is related to the time period for which the transfer sheet is heated.

The Receiver Sheet

The receiver sheet conveniently comprises a polyester sheet material, especially a white polyester film, preferably of polyethylene terephthalate (PET). Although some dyes of Formula (1) are known for the coloration of textile materials made from PET, the coloration of textile materials, by dyeing or printing is carried out under such conditions of time and temperature that the dye can penetrate into the PET and become fixed therein. In thermal transfer printing, the time period is so short that penetration of the PET is much less effective and the substrate is preferably provided with a receptive layer, on the side to which the dye is applied, into which the dye mixture more readily diffuses to form a stable image. Such a receptive layer, which may be applied by co-extrusion or solution coating techniques, may comprise a thin layer of a modified polyester or a different polymeric material which is more permeable to the dye than the PET substrate. While the nature of the receptive layer will affect to some extent the depth of shade and quality of the print obtained it has been found that the dyes of Formula (1) give particularly strong and good quality prints (e.g. fast to light, heat and storage) on any specific transfer or receiver sheet, compared with other dyes of similar structure which have been proposed for thermal transfer printing processes. The design of receiver and transfer sheets is discussed further in EP 133,011 and EP 133012.

The invention is further illustrated by the following examples in which all parts and percentages are by weight.

Ink 1

This was prepared by dissolving 0.3 parts of Dye 1 in 9.7 parts of tetrahydrofuran (THF) and adding 10 parts of a 6.0% solution of EHEC in THF. This ink was stirred until homogeneous.

Inks 2-7

These were prepared in the same manner as Ink 1 using each of Dyes 2-7 in place of Dye 1.

Transfer Sheet TS1

This was prepared by applying Ink 1 to a 6 um polyethylene terephthalate sheet (substrate) using a wire-wound metal Meyer-bar (K-bar No 3) to produce a wet film of ink on the surface of the sheet. The ink was then dried with hot air to give a 3 um dry film on the surface of the substrate.

Transfer Sheets TS2-TS7

These were prepared in the same manner as TS1 using each of Inks 2-7 in place of Ink 1.

Printed Receiver Sheet RS1

A sample of TS 1 was contacted with a receiver sheet, comprising a composite structure based in a white polyester base having a receptive coating layer on the side in contact with the printed surface of TS 1. The receiver and transfer sheets were placed together on the drum of a transfer printing machine and passed over a matrix of closely-spaced pixels which were selectively heated in accordance with a pattern information signal to a temperature of >300° C. for periods from 2 to 10 msec, whereby a quantity of the dye, in proportion to the heating period, at the position on the transfer sheet in contact with a pixel while it was hot was transferred from the transfer sheet to the receiver sheet. After passage over the array of pixels the transfer sheet was separated from the receiver sheet.

Printed Receiver Sheets RS2 to RS7

These were prepared in the same way as RS1 using TS2 to TS7 in place of TS1.

Evaluation of Inks, Transfer Sheets and Printed Receiver Sheets

The stability of the ink and the quality of the print on the transfer sheet was assessed by visual inspection. An ink was considered to be stable if there was no precipitation over a period of two weeks at ambient and a transfer sheet was considered to be stable if it remained substantially free from crystallisation for a similar period.

The quality of the printed impression on the receiver sheet was assessed in respect of reflected optical density (OD) by means of a densitometer (Sakura Digital densitometer). The results of the assessments are shown in Table 1:

TABLE 1

| Receiver Sheet | Optical Density (OD) |
| --- | --- |
| RS1 | 1.8 |
| RS2 | 1.4 |
| RS3 | 1.7 |
| RS4 | 1.5 |
| RS5 | 1.4 |
| RS6 | 2.0 |
| RS7 | 1.7 |

| | | Comparative Examples | | |
| --- | --- | --- | --- | --- |
| Dye | R | $R^4$ | $R^5$ | $R^6$ |
| A | H | $C_2H_5$ | $C_2H_5$ | $NHCOCH_3$ |
| B | H | $C_2H_5$ | $n\text{-}C_4H_9$ | $NHCOCH_3$ |
| C | H | $n\text{-}C_4H_9$ | $n\text{-}C_4H_9$ | $NHCOCH_3$ |

The above dyes were disclosed in European Patent 0218397 and are included herein as comparative examples. Inks A, B and C, Transfer sheets TSA, TSB and TSC, Receiver sheets RSA, RSB and RSC were prepared by the methods as described above for Ink 1, TS1 and RS1 using Dyes A, B and C respectively.

The resistance to finger grease (GNT2) of the prints was assessed by firstly measuring the reflected OD at a number of specific positions on the print before exposing these positions to finger grease and then measuring the reflected OD at the same specific positions after exposure to finger grease and incubation for 3 days at 45° C. and 85% relative humidity. The GNT2 values were corrected by subtracting the average OD loss of positions on the print which were not exposed to finger grease. The GNT2 values are expressed as the average % change in OD where the smaller the value the better is the performance of the dye.

The results of this assessment are shown in Table 2 below:

TABLE 2

| Receiver Sheet | % Change in OD |
| --- | --- |
| RS1 | 0.6 |
| RS2 | 9.7 |
| RS3 | 18.3 |
| RS4 | 6.0 |
| RS5 | 4.4 |
| RS6 | 12.8 |
| RS7 | 17.9 |
| RSA | 23.2 |
| RSB | 21.6 |
| RSC | 18.6 |

Thus the performance of the selected dyes of the present invention is better than the performance of the comparative dyes.

We claim:

1. A thermal transfer printing sheet comprising a substrate having a coating of a disazo dye of Formula (1):

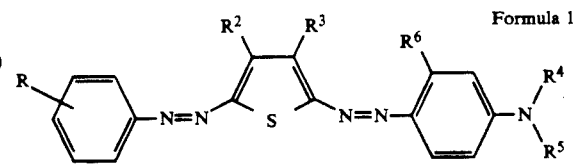

Formula 1 wherein:
R is selected from —H; —CN; —NO₂; —COT¹;
—SO₂T¹; —COOT¹;
—SO₂F; and —SO₂Cl;
each
R¹ is independently selected from —H; —F, —Cl,
—Br; and —CF₃;
n is 1, 2 or 3;
R² is —H or C₁₋₄-alkyl;
R³ is —CN;
R⁴ is a straight or branched chain C₁₋₆-alkyl;
R⁵ is Sec.butyl; and
R⁶ is elected from —H; C₁₋₄-alkyl; and —NHCOT¹;
wherein T¹ is C₁₋₄-alkyl or phenyl.

2. A thermal transfer printing sheet according to claim 1 wherein in the disazo dye of Formula (1)
R is —H, —COOT¹ or —COT¹ in which T¹ is C₁₋₄-alkyl or phenyl;
R¹ is —H;
R² is —H or —CH₃;
R³ is —CN;
R⁴ is C₁₋₄-alkyl;
R⁵ is sec.butyl; and $R^6$ is —H, —CH$_3$ or —NHCOCH$_3$.

3. A thermal transfer printing sheet according to claim 1 or claim 2 wherein in the dye of Formula (1)

R, $R^1$ & $R^2$ are all —H;

$R^3$ is —CN;

$R^4$ is n—C$_4$—H$_9$;

$R^5$ is sec.butyl; and $R^6$ is —NHCOCH$_3$.

4. A dye diffusion thermal transfer printing process which comprises contacting the transfer sheet of claim 1 with a receiver sheet, so that the coating is in contact with the receiver sheet and selectively applying heat at a temperature from 200° C. to 400° C. for a period of from 2 to 10 msec to discrete areas on the reverse side of the transfer sheet whereby the dye on the opposite side of the sheet to the heated areas is transferred to the receiver sheet.

* * * * *